March 30, 1943.   H. M. SAMUELSON   2,315,019
GYROSCOPIC APPARATUS
Filed June 7, 1940
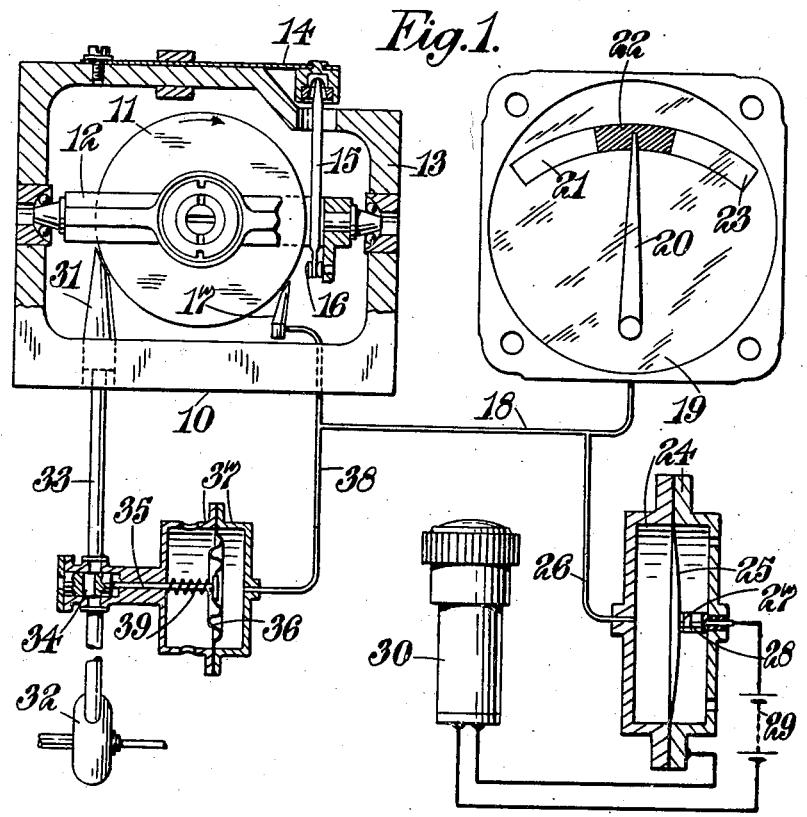

Patented Mar. 30, 1943

2,315,019

UNITED STATES PATENT OFFICE 2,315,019

GYROSCOPIC APPARATUS

Hugh Melvin Samuelson, London, England, assignor to S. Smith & Sons (Motor Accessories) Limited, London, England, a British company Application June 7, 1940, Serial No. 339,376
In Great Britain June 13, 1939

2 Claims. (Cl. 264—14)

This invention relates to gyroscopic apparatus and is primarily concerned with such apparatus for use on aircraft for blind flying, for instance a gyroscopic artificial horizon or rate of turn indicator. Such gyroscopic apparatus may operate incorrectly if the rotor runs slower than a predetermined speed and an object of the invention is to give a warning when the gyroscopic apparatus is inoperative.

According to the present invention a gyroscopic apparatus comprises warning means operated according to the speed of the rotor to give a visual and/or audible indication when the speed of the rotor is below a predetermined value.

According to a further feature of the invention the warning means comprises a Pitot tube which is adjacent the rotor and in which a pneumatic pressure of a value depending on the speed of the rotor is produced by air entrained by the rotor and pressure responsive means connected to said Pitot tube for operating a visual and/or audible signalling device. In some cases, it is of advantage to know when the speed of the rotor exceeds a predetermined value and thus the signalling device aforesaid may provide different signals or indications for normal, low and high rotor speeds.

A further feature of the invention consists in that the warning means comprises an electrically-operated indicator and a control switch operated by means responsive to the speed of the rotor. Thus this control switch may be operated by the pressure responsive means connected to the Pitot tube aforesaid.

In addition to giving a warning of an incorrect rotor speed, it is of advantage to ensure to a large extent that the rotor always runs at the correct speed. In a gyroscopic apparatus in which the rotor is driven by a jet of air, failure of the rotor to develop its proper speed is likely to be due to a lack of air pressure at the jet, generally on account of a partial obstruction in a supply pipe feeding air under pressure to the jet. A further feature of the invention therefore consists in a gyroscopic apparatus having warning means as aforesaid in combination with an air jet for driving the rotor, a valve controlling a supply of air to the jet and pressure responsive means connected to the Pitot tube for moving the valve against the action of a resilient loading member in a direction to reduce the flow of air to the jet. Thus the pipe for supplying the air to the jet may be of unusually large cross-section to minimise the possibility of it being obstructed, the control of the air being obtained by the valve.

In some circumstances, in which a gyroscopic apparatus is used in aircraft, it is required that the rotor of the gyroscopic apparatus should rotate at a speed which is in proportion to the speed of the craft. A further feature of the present invention consists in a gyroscopic apparatus having warning means as aforesaid and in combination therewith an air jet for driving the rotor, a valve controlling a supply of air to the jet and pressure responsive means actuating the valve and operated oppositely by the air pressure developed at the Pitot tube and by the dynamic pressure produced by the craft in flight to control the speed of the rotor according to air speed of the craft.

Specific embodiments of the invention are illustrated by way of example in the accompanying drawing, in which:

Figure 1 is a diagram showing a gyroscopic apparatus for use in aircraft with warning means operated according to the speed of the rotor, together with an automatic control for an air supply for driving the rotor, and Figure 2 is a modification of the arrangement shown in Figure 1 in which the speed of the rotor is automatically controlled according to air speed of the craft.

Referring to Figure 1 of the drawing there is shown a gyroscopic apparatus 10 which in this instance is a rate of turn indicator of the form described in United States patent application No. 254,947 (issued as Patent No. 2,199,290 on April 30, 1940), in which a rotor 11 is rotatably mounted in a gimbal ring 12 which is in turn rotatably mounted in a frame 13, the gimbal ring 12 being maintained in a horizontal position by a leaf-spring 14 acting through a member 15 on a crank 16 on the gimbal ring 12. A Pitot tube 17 is mounted with its open end adjacent the periphery of the rotor 11 so that pneumatic pressure is built up in this Pitot tube by air entrained by the rotor. The Pitot tube 17 is connected by a pipe 18 to a pressure sensitive indicator 19 of known form having a pointer 20 moving over a dial having a part 21 representing low rotor speed, a part 22 representing normal rotor speed and a part 23 representing high rotor speed. The pressure developed in the Pitot tube 17 will depend upon the speed of the rotor 11 so that the position of the indicating pointer 20 will depend upon the rotor speed and indicate whether this speed is normal, or above or below normal.

Alternatively or in addition to the pressure sensitive indicator 19 there is provided a two-part casing 24 divided by a resilient diaphragm 25, the casing at one side of the diaphragm being connected by a pipe 26 to the pipe 18. The diaphragm 25 carries an electric contact 27 co-operating with another contact 28 mounted in but insulated from the casing. This contact is connected through a battery 29 to one terminal of an electric lamp 30, the other terminal of which is connected to the casing 24. When the rotor speed is normal the pneumatic pressure applied to the diaphragm 25 maintains the contacts 27 and 28 closed but for a lower rotor speed, and consequently a lower pressure at the Pitot tube 17, the diaphragm 25 moves due to its resilience to open the contacts 27 and 28 to extinguish the lamp 30.

In Figure 1 the rotor 11 is driven by a current of air applied through a jet 31, the air supply being derived from a pump 32 communicating with the jet by means of a pipe 33. This pipe is of larger bore than is necessary in order to minimise the possibility of the pipe being choked by foreign matter and the air supply is controlled by a valve 34. This valve is connected by a rod 35 to a resilient diaphragm 36 dividing a two-part casing 37. The casing 37 at one side of the diaphragm is connected by a pipe 38 to the Pitot tube 17 such that the pressure developed in the Pitot tube 17 operating upon the diaphragm 36 tends to close the valve 34 against the action of a loading spring 39. The arrangement is such that when the rotor is rotating at the normal speed the pneumatic pressure developed in the Pitot tube 17 and operating upon the diaphragm 36 holds the valve 34 partially closed. If the rotor runs at less than the required speed a correspondingly lower pneumatic pressure is applied to the diaphragm 36 and the valve 34 is more fully opened under the action of the spring 39. The opening of the valve 34 increases the supply of air to the jet 31 for rotating the rotor and a condition is reached when the speed of the rotor increases to substantially its normal value.

In the modification shown in Figure 2, the valve 34, in addition to being controlled according to the speed of the rotor is controlled according to air speed of the craft. Referring to Figure 2, a housing 40 is divided into three chambers 41, 42 and 43, by means of two resilient diaphragms 44 and 45. These diaphragms are of different size due to differences in the fluid pressures which are applied to them and are connected by a rod 46 to the valve 34. The chamber 41 is connected by a pipe 47 to the Pitot tube 17 and the chamber 43 is connected to a Pitot tube 48 producing an air pressure varying with the speed of the craft. The intermediate chamber 42 is connected to a static head 49. With this arrangement the position of the valve 34 depends on the relative values of the air pressure at the Pitot tube 48 and the air pressure at the Pitot tube 17. Should the air speed of the craft fall, the valve 34 is moved to the left in Figure 2 to decrease the supply of air to the jet 31 and thus reduce the speed of the rotor 11. Conversely the rotor speed is increased when the air speed is increased.

The invention is not restricted to the specific forms of warning device hereinbefore described with reference to the drawing. In one alternative construction a centrifugal device is mounted on the rotor and is arranged to control a switch in circuit with a visual indicator, for instance, in the form of an electric lamp; the centrifugal device should be accurately balanced so as not to disturb the normal function of the rotor. The centrifugal device may be arranged to close a switch in circuit with a warning lamp when the speed of the rotor rises above the required value so that so long as the warning lamp is illuminated the pilot knows that the rotor speed is correct. In another alternative construction the rotor is arranged to produce variations in a magnetic field, the magnetic variations being in turn employed to operate a switch for the indicator. For example, a magnet is arranged adjacent the periphery of the rotor so that eddy currents set up by the rotation of the rotor produce a force upon the magnet which is utilised to operate a switch controlling an indicator as aforesaid. Furthermore, an audible warning device may be employed instead of or in addition to the visual warning lamp 30 or indicator 19 and operated in like manner.

I claim:

1. A gyroscopic apparatus comprising a high speed rotor mounted for free rotation, a Pitot tube adjacent the gyroscopic rotor, in which Pitot tube a pneumatic pressure of a value depending on the speed of the rotor is produced by air entrained by the rotor, an air jet directed on the rotor for driving it, means supplying air to said jet, a valve controlling the air supply and pressure responsive means connected to said Pitot tube for moving the valve in a direction to reduce the flow of air to the jet and a resilient loading member for said pressure responsive means.

2. A gyroscopic apparatus for use on aircraft, comprising a rotor, an air jet directed on to the rotor for driving it, means supplying air to said jet, a valve controlling the air supply, a Pitot tube disposed in the air stream leaving the rotor, a pressure-head disposed in the air stream around the aircraft, a pressure-responsive device having a movable element adapted to be influenced in opposite sense by the pressure developed by said Pitot tube and pressure-head, and a transmission between said element and said valve whereby an increase of pressure developed by the Pitot tube tends to close the valve, while an increased pressure developed by the pressure-head tends to open the valve.

HUGH MELVIN SAMUELSON.